Oct. 3, 1944.    R. M. STANLEY    2,359,686
FORCE INDICATOR
Filed April 21, 1942

INVENTOR.
ROBERT M. STANLEY
BY James M. Clark
HIS PATENT ATTORNEY

Patented Oct. 3, 1944

2,359,686

UNITED STATES PATENT OFFICE 2,359,686

FORCE INDICATOR

Robert M. Stanley, Cheektowaga, N. Y., assignor to Bell Aircraft Corporation, a corporation of New York Application April 21, 1942, Serial No. 439,857

10 Claims. (Cl. 73—139)

This invention relates to force-indicating devices for levers and more particularly to such devices which indicate the forces exerted upon aircraft control sticks in one or more directions.

In the design of aircraft, particularly high performance military aircraft, it is essential that the control forces which the pilot is required to exert upon the control stick to operate the control surfaces are measurable for the various flight maneuvers. These forces are relatively great, due to the high relative airspeed at which these aircraft fly and it is important to insure that the forces exerted upon the stick, within the cables and the remainder of the control system, are not excessive. When they are too great they cause fatigue of the pilot and overstress the parts of the control systems.

In aircraft controls for the lighter types of airplanes the usual manual control is by means of a substantially vertically disposed control stick, or joy stick, rockably mounted at its lower, or base, portion upon the aircraft. In such controls, when the "stick" is moved in fore and aft directions, the elevators of the aircraft are moved accordingly to control the diving or climbing attitudes of the airplane; and when it is moved laterally or athwartships the ailerons of the airplane are moved differentially, thereby providing lateral control or imparting a roll to the airplane. The other remaining, or third, basic control for the conventional airplane is usually by means of the rudder bar which controls the direction of the rudder for directional control within the horizontal plane, and this control is not dealt with in the present invention inasmuch as the rudder control is usually separate and is not usually controlled through either the abovementioned control stick or by the control column used in larger and heavier aircraft.

The present invention consists essentially in the provision of a force indicating device disposed in the top of the control stick within the grip portion and the provision of an indicating dial at the upper and preferably curved end of the grip portion for indicating control forces to which the control stick is subjected. In its preferred form this force indicating device comprises principally a vertically or longitudinally slotted tube which by being slotted in this manner is converted into a circular arrangement of columns which are rigidly connected at their top and bottom ends to act as beams, resisting shear loads transverse to the axis of the control stick. Since the lower end of the slotted tube is rigidly fastened to the control stick and the upper end to a hollow hand grip, all forces exerted by the pilot's hand are transferred in shear through the multiple beam arrangement to the control stick in such a manner that substantially parallelogram motion results. This arrangement is such that all secondary torque reactions applied to the control handle do not adversely affect the calibration of the instrument.

It is accordingly a primary object of the present invention to provide a force-indicating device to be carried at the free end of a lever capable of being swung or rocked in a plurality of planes, such that the forces exerted thereon are readily and separately indicated to the pilot, or operator of the lever. It is a further object of this invention to provide such a device which is wholly self-contained within the control stick without projecting appreciably therefrom, and in which all of the parts are protected from damage or interference due to movement of the control lever resulting in its striking other parts of the aircraft, or body of the pilot.

It is a further object of the present invention to eliminate to as great an extent as possible all moving parts in the portion of the device to which the forces are applied and to limit these moving parts to the indicating portion of the device. A further object resides in the provision of an indicating device which is readily visible to the pilot or operator in substantially all of the positions into which the lever may be rocked.

It is a further object of the present invention to provide a device which permits of the use of standard watch movements which do not require too great modification and to provide for the ready removal and replacement of these movements. A still further object resides in providing a light, durable and accurate device which is wholly self-contained and which is adapted for attachment to the standard control sticks in general use. It is also an object to provide such a device which is readily and simply adjusted to its zero position on the indicator.

Other objects and advantages of the present invention will occur to those skilled in the art after a reading of the present specification and the following drawing forming a part hereof, in which.

Figures 1, 2, 3, 4:
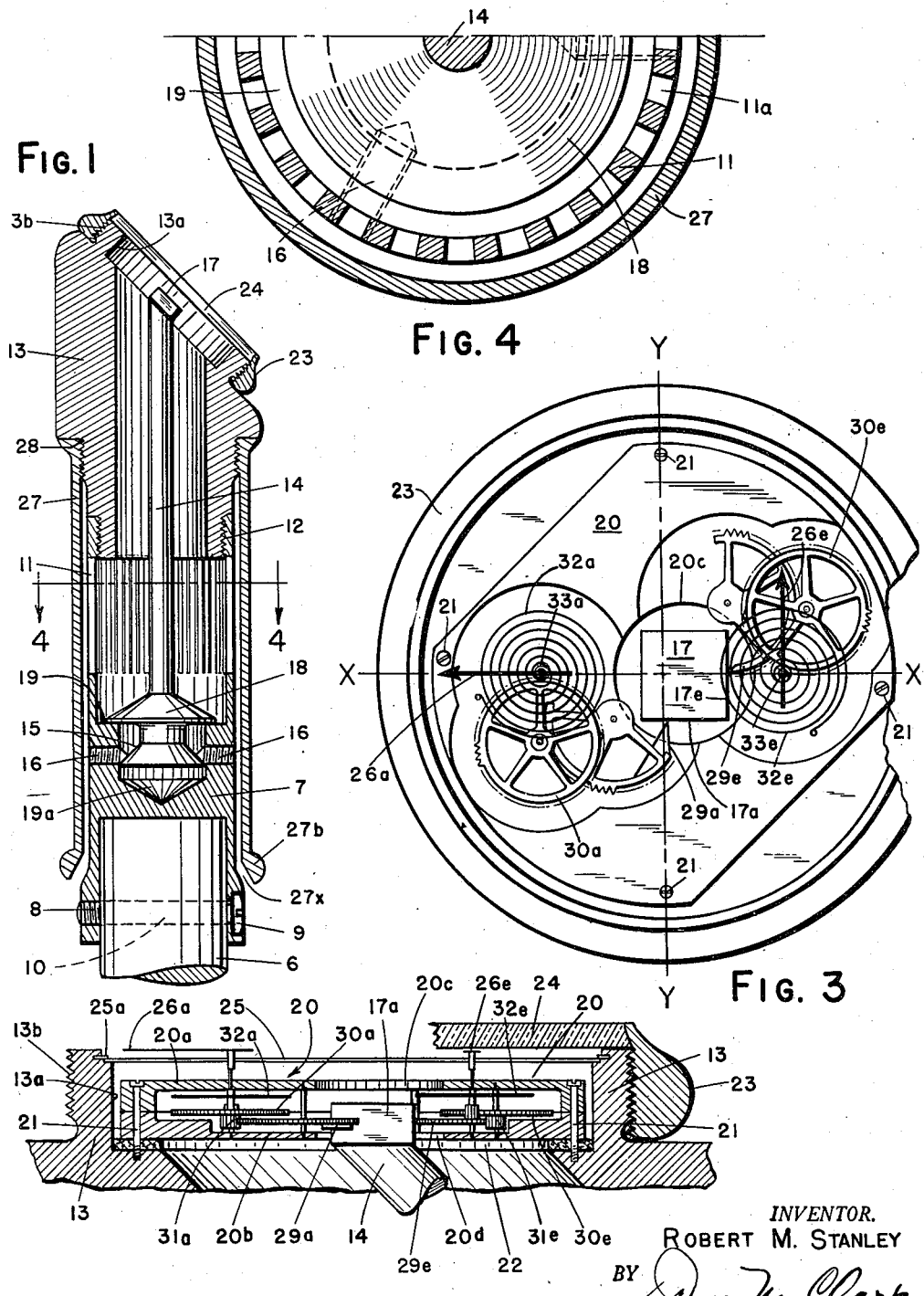
Fig. 1 is a cross-sectional elevation of a preferred form of force indicating device as applied to the upper terminal of an aircraft control stick.
Fig. 2 is a detailed cross-section of the force indicating mechanism at the extreme upper terminal of the device.
Fig. 3 is a detailed plan view of the indicating mechanism shown in Fig. 2.
Fig. 4 is a detailed half section of the device taken along the line 4—4 as indicated in Fig. 1.

Referring now to Fig. 1, the upper portion of a conventional control stick is indicated by the numeral 6. The control stick is rockably mounted at its base portion and connected to the elevator and aileron control surfaces in a manner which is well known in the art and is not considered to require further description. For purposes of understanding the concurrent movement of the surfaces, each of the figures of the drawing have been shown such that movement of the stick to the left of the sheet corresponds to forward longitudinal movement as considered from the pilot's seat and such movement (along the axis X—X of Fig. 3) results in downward movement of the elevators and diving movement of the airplane.

A stick socket element 7 having a lower recessed socket portion is rigidly attached to the upper terminal of the control stick 6 by means of the countersunk screw 10 having a fillister head portion 9 and engaging the threaded hole 8 in the socket portion of the element 7. The upper portion of the socket support member 7 is of recessed tubular form being provided with female threads at its upper portion 12 and being slotted directly therebelow with a plurality of longitudinally extending slots 11a forming a circular arrangement of columns 11 connected at their ends by the tube wall to form a multiple beam arrangement.

The combined flexible socket element mounted upon the upper terminal of the control stick 6, which serves as both a socket portion 7 for the control stick and the multiple slotted beam portion 11, is preferably made up of a single piece of steel. As stated above, the lower recessed tubular portion is rigidly attached by means of the through bolt 10 to the upper portion of the stick and forms a rigid axial extension thereof. The upper slotted tubular portion of the combination element is provided with an internal or female thread at 12 which is adapted to be threadedly attached to the indicator frame member 13. The intermediate or solid portion of the adaptor element 7—11 is provided with a shouldered portion 19 at the upper end of a bore of substantially smaller diameter than the slotted tube portion 11 and which bore terminates at its lower end in a conical recess 19a. Through the wall of the post socket adaptor 7, immediately beneath the shoulder 19, there are provided three conic-pointed headless set screws 16, preferably arranged 120° apart around the circumference of the adaptor element.

A rigid steel indicator post 14, which is provided at its lower or base portion with two frusto-conical portions 15 and 18 respectively, with an intermediate cylindrical portion connecting these conic portions, is rigidly mounted within the intermediate recessed portion of the combined adaptor element 7—11. The outside diameter of the lower conic portion 15 is somewhat less than that of the upper conic portion 18, the lower portion fitting within the smaller bore portion of the adaptor 7, and being adjustably retained therein by means of the set screws 16 the conic points of which bear upon the conic surface of the portion 15 and thereby draw the lower face of the upper portion 18 against the shoulder 19 of the adaptor 7. The post 14 continues upwardly from its single support mounting through the interior of the members 11 and 13 co-axially therewith to terminate in a head portion 17 set at an angle to the post axis. This angle is approximately 45° to the vertical and is chosen in order to bring the indicating mechanism, forming an essential portion of this device, normal to the line of vision of the pilot so that the same may readily be viewed throughout all of its operative positions.

The upper end 17 of the post 14 is formed with a squared cross section which has two smoothly polished faces 17e and 17a perpendicular to each other and perpendicular to the longitudinal and lateral axes of the aircraft which consequently brings it perpendicular to the direction of the elevator and aileron movements respectively of the control stick 6.

The indicator frame 13 is formed of any suitable shape to contain and provide operational clearance for the post 14, and is provided with downwardly extending threaded portions 12 and 28, 12 being the lower and lesser diameter portion for the threaded accommodation of the upper slotted terminal of the adaptor element 7—11. The length of the lower threaded portion 12 of the indicator frame or housing 13 is preferably such that the lower end of the member 13 terminates in the region of the upper terminus of the slots in the tubular portion 11 of the adaptor element. A cylindrical hand grip or cover portion 27 has a knurled outer surface and an upper female threaded end at 28 which is adapted to engage the threaded shouldered portion of the same numeral of the indicator frame 13. This hand grip portion 27 is provided at its lower end with an outwardly chamfered portion terminating in a bulb or bead 27b and providing a clearance space 27x between its inner surface and the outer surface of the socket portion 7. The inside diameter of the cover grip 27 is substantially larger than the outside diameter of the socket adaptor 7—11 in order that, upon deflection of the slotted upper portion 11, sufficient clearance is at all times maintained such that this deflection is not impeded or interrupted by contact of the inner surface of the hand grip 27 with the adaptor 7—11.

The upper end of the housing or head element 13, which is preferably inclined at 45° to facilitate an easier reading of the dials, has an internally recessed portion 13a for the reception of the indicator mechanism 20, and is provided on its adjacent outer portion with the threads 13b. A knurled bezel or retainer ring 23 which is provided with a female thread is adapted to engage the threads 13b and to retain thereagainst a flat glass disc or crystal 24 which serves as a cover or protection for the indicating mechanism 20 to be hereinafter described.

The indicator mechanism 20 is more clearly indicated in detail in Figs. 2 and 3, from which it will be noted that it comprises two gear wheel trains from watch movements which are mounted between the upper and lower mechanism sections 20a and 20b respectively, being interiorly recessed to provide a protected space for the gearing and bearings of the watch movements, and within each of which sections are provided the central openings 20c and 20d respectively. The indicator mechanism is rigidly attached to the socket portion 13a of the head 13 by means of the four attachment screws 21 and has interposed between its lower surface and the shoulder of the socket portion a ring washer 22.

As stated above, the indicator mechanism is comprised of two watch movements, there being one for indicating force exerted by the pilot upon the stick in a forward direction along axis X—X, for application upon the elevators, as well as one for the lateral force along axis Y—Y exerted upon the stick for movement of the ailerons. Each of these gear trains are substantially identical except for their position and arrangement within the indicating mechanism case 20 and a description of one will suffice for the other. The second wheels of these watch movements are modified and provided with contact portions for continual contact against the above mentioned polished surfaces of the squared post end 17 which is arranged to come within the central opening 20c and 20d within the indicator mechanism. These sector wheels 29a and 29e, the former being for aileron forces and the latter for elevator forces, are held in contact with the lateral and rear faces of the squared post end respectively, this continual contact being maintained by means of the hairsprings 32a and 32e. The arbor or shaft of the contact sector wheel 29a is suitably journalled in the upper and lower halves of the indicator mechanism portions 20a and 20b. The contact sector wheel 29a is in meshing engagement with the arbor of the intermediate wheel 30a by means of its engagement with the pinion 31a mounted upon the same shaft. The wheel 30a in turn meshes with a pinion mounted upon the shaft 33a upon which the pointer 26a and the hairspring 32a are also mounted, the other terminal of the spiral hairspring being anchored in the usual manner to the fixed housing 20.

Referring now to the plan view of the indicator mechanism in Fig. 3 it will be noted that the transverse axis indicated by the letters Y—Y, and the longitudinal axis X—X each represent the corresponding axes of the aircraft, control stick and the indicator mechanism. Both of these axes, which are perpendicular to each other, pass through the squared post end 17 and pass substantially through the points at which the wheel sectors 29a and 29e contact the polished surfaces 17a and 17e of the post head 17. It will be noted that the contact sector 29a engages the side of the post head 17 along the lateral line Y—Y such that lateral forces which are applied to the knurled hand grip portion 27 and cause flexure or deflection of the slotted tube 11 are transmitted to the head portion 13 to which it is rigidly threaded and also to the indicator mechanism 20 which is rigidly attached to the head 13 by the screws 21. Since these forces impart deflection to the multiple column system represented by the slotted tubular portion 11 in proportion to their magnitude, these deflections are translated into a relative displacement between the fixed post end 17 and the remainder of the upper or grip assembly which moves in relation thereto.

Accordingly, if for example the pilot moves the hand grip portion 27 toward his left or downwardly as viewed by the reader in Fig. 3, the movable portion of the assembly comprising the upper tubular slotted portion 11 of the adaptor 7, the head 13 and the indicator mechanism 20 rigidly attached thereto, will move downwardly away from the fixed post end 17 tending to separate the lower polished surface 17a thereof from the contact sector 29a. The latter, however, is under the continual influence of the hairspring 32a which causes the contact sector 29a, through the gear train, to follow the post end upwardly in this figure and to cause a corresponding movement of the needle 26a to indicate upon the dial 25 the magnitude of the displacing force exerted by the pilot. Obviously, movement by the pilot of the control grip portion 27 to the right for opposite operation of the aileron results in movement of the indicator needle 26a in the opposite direction. Likewise, either fore or aft movement of the control grip portion 27 for operation of the elevators of the aircraft will also impart corresponding movements of the elevator indicating pointer or needle 26e. In the movements of the control portion 27, the hairsprings 32a and 32e serve to take up the back-lash between the units of the gear train in addition to their function of resiliently maintaining the wheel sectors in contact with the post faces regardless of whether the faces are projecting or receding from the normal central position of the gear train mechanism.

Referring now to the cross section in Fig. 2, it will be noted that the hairspring shaft 33a extends upwardly through its bearing in the upper half of the casing portion 20a and also through the dial face 25 which is retained within the mechanism housing 13 by means of the spring clips 25a. The surface of the dial face 25 is suitably calibrated or provided with indicia over which the pointers 26a and 26e sweep thereby indicating to the pilot the magnitude of the forces which he is applying to the control stick during the flight of the airplane for the operation of the ailerons and elevators. In this connection it should be noted that the hairsprings 32a and 32e insure continuous bearing of the contact sectors which convert the linear deflection into rotary motion of the sector and cause corresponding rotation of the indicating hands 26a and 26e, the stick forces being indicated below the hand on the calibrated dial 25. Each gear train of the modified watch movement portions is so arranged that movement of the elevator causes no movement of the aileron hand, and vice versa, aileron movements do not affect those of the elevator hand. When, however, the control stick is moved both longitudinally and laterally the respective forces exerted in each direction are separately and simultaneously indicated on the respective dial portions without any effect on one from the other. The needles are each readily set to their zero positions under their no-load conditions by corresponding adjustment of the conic set screws 16 properly positioning the end 15 of the post 14 and thereby the relationship of the polished faces 17a and 17e with respect to the contact sectors 29a and 29e.

It accordingly will be noted that this device operates by means of a relatively simple, foolproof, and well protected mechanism. By slotting the tube it is converted into a circular arrangement of columns which are rigidly connected at top and bottom ends to act as beams resisting all shear loads transverse to the axis of the control stick. The lower end of the slotted tube 11 is fastened to the control stick at 7 and the upper end to the hollow hand grip 27, and all forces exerted by the pilot's hand are transferred in shear through the multiple beam arrangement 11 to the control stick 6 in such manner that substantially parallelogrammatic action is obtained. As a result no secondary torque reactions applied to the control handle 27 can adversely affect the calibration of the instrument. Obviously, other forms of operative connection may be employed for transmitting relative movement between the post end 17 and the gear wheel contact sectors in order to transmit its relative linear movement into rotary movement of the needle. The dial face also may be so calibrated that pressure or force applied to the knurled grip 27 is indicated directly in pounds, or the dial may be calibrated to indicate this force in foot pounds, inch pounds, or, of course, in any other desired system of force measurement.

Other forms and modifications of the present invention, both with respect to its general characteristics and its detailed features, will become apparent to those skilled in the art to which it pertains, but all are intended to come within the scope and spirit of the present invention, as more particularly defined in the appended claims.

I claim:

1. A force indicating device for a lever comprising a rigid post member fixedly attached at one end to the free portion of said lever, a flexible tubular element having a socket portion rigidly attached to said lever and having a cylindrical wall spatially disposed about said post element, a support element attached to the free end of said flexible tubular portion, indicating mechanism carried by said support element in engagement with the free end of said post member, and a tubular hand grip portion attached to said support element and spatially disposed about said flexible element whereby flexural displacements imparted to said tubular element through said grip portion are indicated by said mechanism in accordance with its displacement with respect to said post member.

2. A force indicating device for a lever comprising; a tubular grip assembly having a socket portion rigidly attached to an end of the lever, a rigid post element having an end attached to said lever end, said grip assembly having a tubular portion spatially embracing said post element, the said grip assembly having a longitudinally slotted intermediate portion, and gear train indicating mechanism carried by the free end of said grip assembly in continual contact with the free end of said post element whereby forces applied to said grip portion are indicated by said mechanism in contact with the free end of said post element in accordance with the flexural deflections of said slotted portion with respect to said internal relatively fixed post element.

3. A force indicating device for a control stick comprising a rigid post element having a lower terminal fixedly attached to the upper end of said control stick in axial continuation thereof, a tubular member having its lower portion fixedly attached to said control stick and extending substantially co-extensively with and in surrounding relationship with respect to said axially disposed post element, the said member having a grip portion adjacent its free upper portion, the tubular wall of said member intermediate said attached and grip portions being longitudinally slotted to provide a circular arrangement of columns rigidly connected at their top and bottom ends to the grip and attached portions respectively, indicating means carried by the free end of said member in spring-loaded contact with the free terminal of said rigid post element, whereby control forces imposed upon said grip portion are transferred in shear through said multiple beam arrangement to said lever such that substantially parallelogram motion is imparted to said slotted tube portion and resulting displacements between the free terminals of said member and said rigid post element are indicated as control forces by said indicating mechanism.

4. A force indicating device for an aircraft control stick comprising a rigid post element adjustably fixed to the upper free portion of said control stick in substantial continuation thereof, a tubular member having its lower portion fixedly attached to the said free portion of said control stick and extending in substantial continuation of said control stick in an externally surrounding and spaced relationship with respect to said post element, the said tubular member having its upper free portion adjacently disposed with respect to the free portion of said rigid post element, a manual gripping area associated with said upper portion of said tubular member, said tubular member having its wall portion intermediate said grip and attached portions longitudinally slotted to permit transverse displacements of said grip portion with respect to the upper portion of said post element, and indicating mechanism carried by said upper portion of said tubular member comprising a scale fixed to said upper portion of said tubular member, a spring-loaded gear train in continual contact with the free terminal of said post element and a pointer operatively associated with said gear train to sweep over said scale whereby control forces applied to said grip portion are indicated by said pointer upon said scale.

5. In combination with an aircraft control stick, a flexible tubular element forming a continuation of said control stick attached to the upper terminal thereof, indicating mechanism carried upon said flexible element, a grip element rigidly attached to said indicating mechanism in an encircling disposition with respect to said flexible element, and post means rigidly attached to said upper control stick terminal centrally disposed with respect to said flexible element having its upper terminal in engagement with said indicating mechanism and adapted to actuate the same in accordance with flexural movements of said flexible element with respect to said control stick as imparted thereto by forces acting upon said grip element.

6. In an aircraft, a control stick disposed for operation in front of a pilot position, a force indicating grip assembly having a socket portion attached to the upper terminal of said control stick in alinement therewith, said assembly including a flexible portion adjacent said socket portion, said assembly having a rearwardly and upwardly facing opening in its upper portion, an indicating dial and pointer housed within said opening of said upper portion of said grip assembly angularly disposed with respect to the axis thereof such that it is substantially normal to a pilot's line of vision directed thereto, a post element fixed to the said socket portion at the upper terminal of said control stick, gear mechanism operatively connected to said pointer and in continual engagement with said post element such that control forces imposed upon said grip assembly initiate relative movement of said flexible portion with respect to said post element whereby the forces are indicated by said pointer upon said dial.

7. A force indicating device for a lever movably mounted at its inner end comprising; a rigid post element having a part-conic shouldered base, a hand grip assembly having a socket portion attached to the outer end of said lever, the said base of said post element being adjustably supported in said socket portion, force indicating mechanism carried by the outer portion of said assembly, said mechanism including a spring-pressed element in continual contact with the outer terminal of said post element, said assembly having a deflectable intermediate portion, and conic pointed screws threadedly supported within said socket portion engaging said base of said post element for adjustment and retention of said post with respect to said socket portion whereby in the unloaded condition of said grip assembly the relationship of said post element may be adjusted by said screws with respect to said indicating mechanism to permit the setting thereof to its zero position.

8. An aircraft control stick having its lower portion mounted for lateral and longitudinal rocking movements respectively for effectuating the control of the aircraft, a rigid post member fixedly mounted at one end upon the upper portion of said control stick, a flexible hand grip assembly mounted upon said upper stick portion spatially encircling said post element, and indicating mechanism carried by said grip assembly in engagement with the other said end of said post member whereby forces for the effectuation of said lateral and longitudinal controls imposed upon said grip portion are separately indicated by said mechanism as a result of relative movement of said flexible grip assembly with respect to said rigid post member.

9. A control lever of the force indicating type mounted at one terminal for pivotal movement, a force indicating device carried by the opposite free terminal of said lever comprising a longitudinally slotted hollow element fixedly attached at its inner terminal to the said free terminal of said lever, a tubular hand grip member attached to the outer terminal of said hollow element and co-axially encircling the same such that control forces applied to said grip member impart relative movements to the outer terminal of said hollow element with respect to said lever, a rigid element fixedly attached to the said free terminal of said lever forming a fixed extension thereof centrally disposed with respect to said hollow element and grip member, and indicating means carried by said hollow element in engagement with said rigid element adapted to indicate the magnitude of control forces applied to said hand grip member.

10. A device for indicating forces applied to a lever rockably mounted in the region of one of its terminals, including rigid post means attached to the lever in the region of its other terminal, a longitudinally slotted tube attached at one end to the second said terminal of said lever in a co-axially surrounding relationship with respect to said rigid post means, manual grip means attached to the remaining end of said slotted tube, and indicating means carried by said manual grip means in continual contact with said rigid post means whereby the magnitude of forces applied to said manual grip means caused by deflection of said slotted tube with respect to said rigid post means is shown by said indicating means.

ROBERT M. STANLEY.